US008892565B2

(12) United States Patent
Xu et al.

(10) Patent No.: US 8,892,565 B2
(45) Date of Patent: Nov. 18, 2014

(54) METHOD AND APPARATUS FOR ACCESSING AN AUDIO FILE FROM A COLLECTION OF AUDIO FILES USING TONAL MATCHING

(75) Inventors: Jun Xu, Singapore (SG); Huayun Zhang, Singapore (SG)

(73) Assignee: Creative Technology Ltd, Singapore (SG)

( * ) Notice: Subject to any disclaimer, the term of this patent is extended or adjusted under 35 U.S.C. 154(b) by 1512 days.

(21) Appl. No.: 12/301,878

(22) PCT Filed: May 22, 2007

(86) PCT No.: PCT/SG2007/000140
§ 371 (c)(1),
(2), (4) Date: Jun. 15, 2011

(87) PCT Pub. No.: WO2007/136349
PCT Pub. Date: Nov. 29, 2007

(65) Prior Publication Data
US 2011/0238666 A1    Sep. 29, 2011

Related U.S. Application Data

(63) Continuation of application No. 11/439,760, filed on May 23, 2006, now abandoned.

(51) Int. Cl.
*G06F 7/00* (2006.01)
*G06F 17/30* (2006.01)

(52) U.S. Cl.
CPC .... *G06F 17/30017* (2013.01); *G06F 17/30743* (2013.01); *G06F 17/30758* (2013.01)
USPC .............................. 707/741; 84/609; 704/207

(58) Field of Classification Search
CPC .................... G06F 17/30017; G06F 17/30743;
G06F 17/30758; G10L 21/003; G10H 1/34;
G10H 2210/066; G10H 2210/385
USPC .......................................................... 707/741
See application file for complete search history.

(56) References Cited

U.S. PATENT DOCUMENTS 4,915,001 A    4/1990 Dillard
6,938,209 B2   8/2005 Ogawa et al.
(Continued)

FOREIGN PATENT DOCUMENTS

WO    WO 01/69575    9/2001

OTHER PUBLICATIONS

Batke, J. et al., "A Query by Humming System Using MPEG-7 Descriptors", Audio Engineering Society, Convention Paper 6137, Presented a the 116th Convention, 2004, May 8-11, Berlin, Germany. http://www.nue.tu-berlin.de/Publikationen/papers/00130.pdf.

(Continued)

*Primary Examiner* — Binh V Ho
(74) *Attorney, Agent, or Firm* — Russell Swerdon; Desmund Gean (57) ABSTRACT

There is provided a method for accessing at least one audio file from a collection comprising more than one audio file stored within or accessible with an electronic device. The method includes generating one index comprising of information entries obtained from each of the more than one audio file in the collection, with each audio file in the collection information being linked to at least one information entry; receiving an input during an input reception mode; converting the input into a digital signal using an analog-digital converter; analyzing the digital signal using either frequency spectrum analysis or melody contour analysis into discrete portions; and comparing the discrete portions with the entries in the index. It is advantageous that the audio file is accessed when the discrete portions substantially coincide with at least one of the information entries in the index. The discrete portions may be musical notes, melody contours or waveforms. The at least one information entry may also be musical notes, melody contours or waveforms. An apparatus employing the aforementioned method is also disclosed.

12 Claims, 5 Drawing Sheets

(56) References Cited

U.S. PATENT DOCUMENTS

| | | | |
|---|---|---|---|
| 7,031,980 B2* | 4/2006 | Logan et al. | 1/1 |
| 7,488,886 B2 | 2/2009 | Kemp | |
| 7,544,881 B2 | 6/2009 | Makino et al. | |
| 7,919,706 B2* | 4/2011 | Tsui et al. | 84/618 |
| 2004/0060424 A1 | 4/2004 | Klefenz et al. | |
| 2007/0195963 A1* | 8/2007 | Ko et al. | 381/26 |
| 2007/0279494 A1* | 12/2007 | Aman et al. | 348/169 |
| 2008/0232573 A1* | 9/2008 | Fletcher | 379/221.01 |
| 2008/0236364 A1 | 10/2008 | Fujishima et al. | |
| 2009/0064851 A1 | 3/2009 | Morris et al. | |

OTHER PUBLICATIONS

Quackenbush, S. et al., "Overview of MPEG-7 Audio", IEEE Transactions on Circuits and Systems for Video Technology, vol. 11, No. 6, Jun. 2001. http://ieeexplore.ieee.org/ie15/76/20050/00927430.pdf.

Rho, S. et al., "FMF: Query Adaptive Melody Retrieval System", Journal of Systems and Software, vol. 79 Issue 1, Jan. 2006, pp. 43-56. http://www.semgrid.net/Citation-Before-2006.1/++JSS-2006-1.pdf.

Rho, S. et al., "Fast Melody Finding Based on Memorable Tunes", Proceedings of 1st International Symposium on Computer Music Modeling and Retrieval, Montpellier, France p. 227-239, May 26-27, 2003. http://avis.ajou.ac.kr/clazzang/home/pubs/CMMR2003/CMMR2003.pdf.

Chai et al., "Melody Retrieval on the Web", Proceedings of ACM/SPIE, Conference on Multimedia Computing and Networking, Jan. 2002. http://alumni.media.mit.edu/~chaiwei/papers/chai_MMCN2001.pdf.

Sonoda et al., "A WWW-Based Melody-Retrieval System—An Indexing Method for a Large Melody Database", ICMC2000 (International Computer Music Conference 2000), Sep. 2000. http://www.sonoda.net/papers/sonoda-icmc2000.pdf.

Blackburn, S. "Content Based Retrieval and Navigation of Music Using Melodic Pitch Contours", PhD thesis, Faculty of Engineering an Applied Science Department of Electronics and Computer Science, 2000. http://www.beeka.org/research/pubs/phdthesis.pdf.

* cited by examiner

| Musical Notes | Do | Re | Mi | Re | Do |
|---|---|---|---|---|---|
| Pitch (Midi Key Value) | 60 | 62 | 64 | 62 | 60 |
| $\Delta$<br>Pitch(current) − Pitch(previous) | 0 | 2 | 2 | -2 | -2 |
| $1^{st}$ Order Melody Contour (UDR)<br>U: $(\Delta) > 0$;<br>R: $(\Delta) = 0$;<br>D: $(\Delta) < 0$; | R | U | U | D | D |
| $\Delta\Delta$<br>$\|\Delta(current)\| - \|\Delta(previous)\|$ | 0 | 2 | 0 | 0 | 0 |
| $2^{nd}$ Order Melody Contour (udr)<br>u: $(\Delta\Delta) > 0$;<br>r: $(\Delta\Delta) = 0$;<br>d: $(\Delta\Delta) < 0$; | r | u | r | r | r |

| Musical Notes | Do | So | La | So | Do |
|---|---|---|---|---|---|
| Pitch (Midi Key Value) | 60 | 67 | 69 | 67 | 60 |
| Δ<br>Pitch(current) − Pitch(previous) | 0 | 7 | 2 | -2 | -7 |
| 1$^{st}$ Order Melody Contour (UDR)<br>U: (Δ) > 0;<br>R: (Δ) = 0;<br>D: (Δ) < 0; | R | U | U | D | D |
| ΔΔ<br>\|Δ(current)\| − \|Δ(previous)\| | 0 | 7 | -5 | 0 | 5 |
| 2$^{nd}$ Order Melody Contour (udr)<br>u: (ΔΔ) > 0;<br>r: (ΔΔ) = 0;<br>d: (ΔΔ) < 0; | r | u | d | r | u |

Figure 5

METHOD AND APPARATUS FOR ACCESSING AN AUDIO FILE FROM A COLLECTION OF AUDIO FILES USING TONAL MATCHING

FIELD OF INVENTION

This invention relates to a method and apparatus for accessing an audio file from a collection of audio files, and particularly relates to the accessing of files using tonal matching.

BACKGROUND

The advent of the age of affordable digital entertainment has given rise to a sharp increase in the adoption of personal digital entertainment devices by consumers. Such personal digital entertainment devices are usually equipped with storage capacities of a range of sizes. Given the falling prices of storage devices like hard drives and flash memory, an increasing number of personal digital entertainment devices come with storage capacities exceeding 1 Gigabyte (GB). Storage capacities of such sizes in personal digital entertainment devices used for audio files enable the storage of hundreds and even thousands of files.

While the audio files may be stored and categorisable according to their song titles, artistes, genre or the like, there may be instances where a user may forget the title or artiste of a song, rendering a search for the pertinent audio file akin to searching for a needle in a haystack. In many instances, the user may only be able to remember a portion of the song or its tune. At the present moment, this does not aid in the search for the pertinent audio file in any way. This is a problem when attempting to access audio files in a large collection of audio files where certain information like title or artiste of a song is unknown. This problem also arises when the visually impaired attempts to access audio files in a collection of audio files where they are unable to select the audio files through the use of sight.

It is also rather difficult to improve one's vocal prowess without engaging expensive vocal coaches. It is currently difficult to improve one's vocal prowess independently besides using karaoke machines with "scoring" functionalities incorporated in them. There are currently few devices available which are able to determine the quality of one's vocal prowess easily and conveniently.

SUMMARY OF INVENTION

In a preferred aspect of the present invention, there is provided a method for accessing at least one audio file from a collection comprising more than one audio file stored within or accessible with an electronic device. The method includes generating one index comprising of information entries obtained from each of the more than one audio file in the collection, with each audio file in the collection information being linked to at least one information entry; receiving an input during an input reception mode; converting the input into a digital signal using an analog-digital converter; analysing the digital signal using either frequency spectrum analysis or melody contour analysis into discrete portions; and comparing the discrete portions with the entries in the index. It is advantageous that the audio file is accessed when the discrete portions substantially match at least one of the information entries in the index. It is preferable that the discrete portions are, for example, musical notes, melody contours or waveforms. The at least one information entry may also be musical notes, melody contours or waveforms. It is preferable that the melody contour analysis is based on analyzing a first order melody contour (UDR), a second order melody contour (udr) and a duration contour (LSK) for an audio output for each audio file for generating a "closeness" score used for audio file matching.

The input may preferably be speaker independent and may be in the form of singing, humming, whistling, Musical Instrument Digital Interface (MIDI) signals or musical notes. The form of input may preferably be either manually or automatically selectable.

It is preferable that the audio file is accessible from the electronic device itself, a device functionally connected to the electronic device or a connected computer network. The information entry may also preferably be received from the audio file, a pre-recorded vocal entry linked to the audio file, or a connected computer network. It is preferable that the electronic device is selected from the group comprising: vehicle audio system, desktop computer, notebook computer, Personal Digital Assistant (PDA), portable media player and mobile phone.

It is also preferable that the method further includes selecting a facility to access the audio files by depressing a predetermined button at least once, and filtering the input.

There is also provided an apparatus for accessing at least one audio file from a collection comprising more than one audio file stored within or accessible with the apparatus. It is preferable that the apparatus includes an indexer for generating an index comprising of information entries obtained from each of the more than one audio files in the collection, with each audio file in the collection information being linked to at least one information entry; an input reception receiver for receiving an input during an input reception mode; converting the input into a digital signal using an analog-digital converter; and a processor configured to analyse the digital signal using either frequency spectrum analysis or melody contour analysis into discrete portions, the processor also being able to compare the discrete portions with the entries in the index. Advantageously, the audio file is accessed when the discrete portions substantially match at least one of the information entries in the index. The apparatus may include a display and the input may be filtered. The input reception mode may be activated by depressing at least one button at least once. It is preferable that the discrete portions are musical notes, melody contours or waveforms. Preferably the melody contour analysis is based on analyzing a first order melody contour (UDR), a second order melody contour (udr) and a duration contour (LSK) for an audio output for each audio file for generating a "closeness" score used for audio file matching.

It is preferable that the apparatus is selected from the group comprising: vehicle audio system, desktop computer, notebook computer, PDA, portable media player and mobile phone.

It is preferable that the input is either manually or automatically selected from the group comprising: singing, humming, whistling, MIDI signals and musical notes. Advantageously, the input is speaker independent. The at least one information entry may be selected from either musical notes or waveforms. Preferably, the at least one information entry is received from the audio file, a pre-recorded vocal entry linked to the audio file, or a connected computer network. The audio file may be accessible from the electronic device itself, any device functionally connected to the electronic device or a connected computer network.

There is also provided a method of determining a level of quality for vocal input using the aforementioned apparatus.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

The following discussion is intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
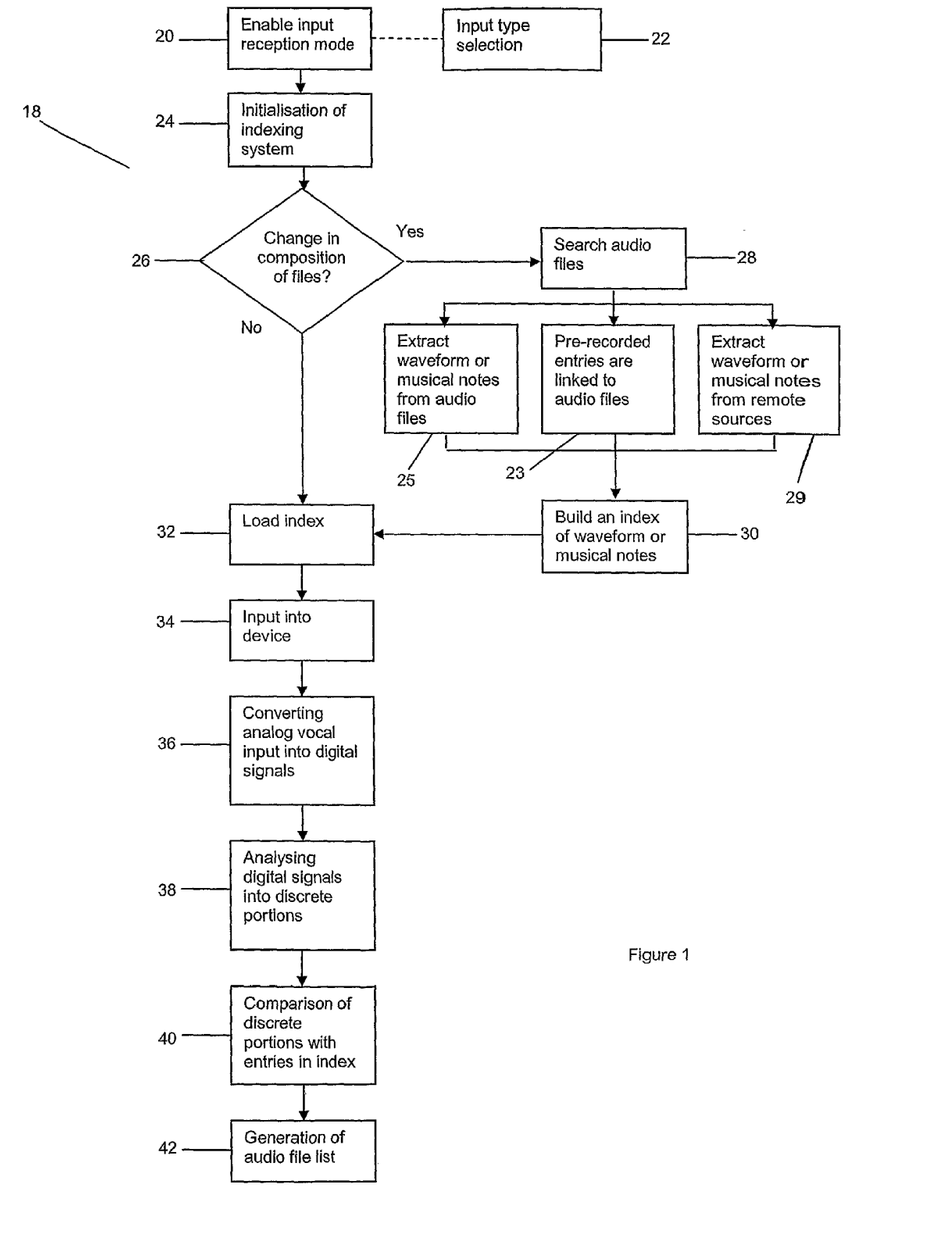
FIG. 1 shows a flow chart of a method of a preferred embodiment of the present invention.

Referring to FIG. 1, there is provided flow chart of a method (18) for accessing at least one audio file from a collection comprising more than one audio file stored within or accessible with an electronic device. The electronic device may be, for example, a vehicle audio system, a desktop computer, a notebook computer, a PDA, a portable media player or a mobile phone and the like. The method may include an enablement of a input reception mode (20) in the electronic device in a manner like, for example, depressing a pre-determined button on the electronic device at least once. The input reception mode may be enabled or disabled as it may prevent a power source in the electronic device from being continually drained by continual enablement of the input reception mode. The input reception mode may be for input such as, for example, singing, humming, whistling, MIDI signals or musical notes. Analog input may be converted to digital input using an analog-digital converter.

The enablement of the input reception mode in the electronic device may initialise an indexing system (24). Once the indexing system is initiated, the system then determines whether the composition of audio files in the collection has changed (26). The composition of audio files may include the number of audio files and the audio filenames. The index may comprise information entries obtained from each of the more than one audio file in the collection of audio files stored in the electronic device, any device functionally connected to the electronic device or a connected computer network. Connection to the computer network may be via wired or wireless means. Each audio file in the collection may be linked to at least one information entry in the index. The at least one information entry may be musical notes or waveforms determined using semantic segmentation corresponding to a portion or the whole content stored in the audio files. The information entry may also be a MIDI component that is linked/attached to an audio file like file metadata. The information entry may also be obtainable from a pre-recorded vocal entry linked/attached to the audio file, or a connected computer network. There may be an online database on the connected computer network where information entries of musical notes or waveforms are downloadable for each audio file. The information entry may include a first order melody contour (UDR), a second order melody contour (udr) and a duration contour (LSK) for an audio output for each audio file.

If the composition of audio files is found to be different, a search is conducted on the collection of audio files stored in the electronic device, any device functionally connected to the electronic device or a connected computer network (28). This step is to determine whether audio files have been added to or removed from the collection. Subsequent to the search, information entries obtained from each audio file directly (25), information entries downloaded from the connected computer network for each audio file (29), or pre-recorded vocal entries linked to each audio file (23) may be combined into an index (30). The index is then loaded for use (32) in the electronic device.

If the composition of audio files is found to be unchanged, the last used index is then loaded for use (32) in the electronic device. With the enablement of the input reception mode, there may be input into the device (34). The input may be singing, humming, whistling, MIDI signals or musical notes. In a particular instance, the input need not be a song in its entirety. A portion of a song may be sufficient as a viable form of the input. The input may be filtered. A user may be able to manually select a specific input (22) for the input reception mode. There may also be automatic detection of input but this mode typically utilizes more power. Input reception by the electronic device may be speaker independent. The input reception mode may have automatic volume correction for vocal input if the vocal input is either too loud (such that distortion of input occurs) or too soft (such that input is inaudible). The electronic device may also be able to overcome the problem of an off tune vocal input during the input mode by providing a selection of audio files that most closely approximates to the off tune vocal input based on the entries of the audio files in the index. The user may set the device to show the closest approximations up to a pre-determined number, such as, for example, the ten closest approximations.

Subsequently, the input in analog form is converted into digital signals by an analog-digital converter (36). The converter may be an analog-MIDI converter. Thereafter, a processor in the electronic device may analyse the digital signals into discrete portions, where the discrete portions may be either musical notes or waveforms. Processing of the digital signals may be done using frequency spectrum analysis or melody contour analysis. The processor may then compare the discrete portions with entries in the index (40). Exact or substantial similarity between the discrete portions and entries in the index enables the generation of a listing of audio files in order of extent of similarity (42). The listing may show a number of audio files, a number that may be pre-determined by the user and may be shown on a display on the electronic device. The extent of similarity may be based on relative closeness in terms of either musical notes or waveforms. The index may comprise the melody contour information for each audio file.

Figure 3:
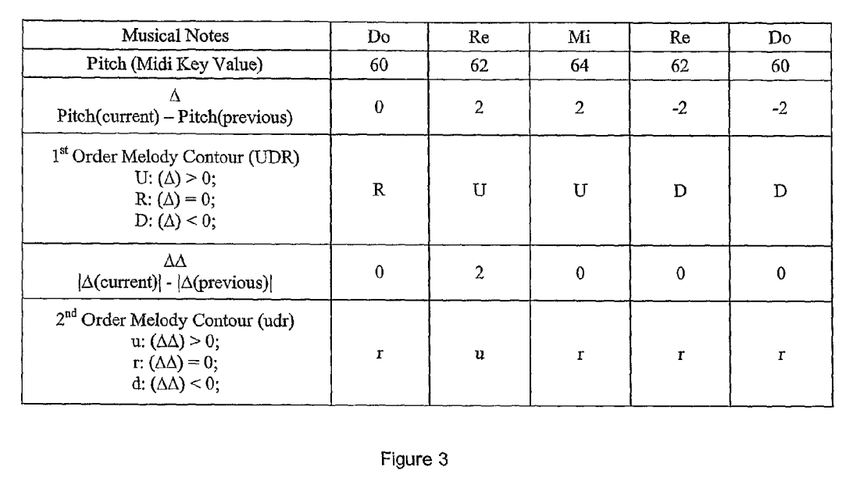
FIG. 3 shows an example to illustrate how the first order melody contour (UDR), and the second order melody contour (udr) for a melody is derived.

Referring to FIG. 3, there is shown an example to illustrate how the first order melody contour (UDR), and the second order melody contour (udr) for a tune is derived. In this example, the tune is "Do Re Mi Re Do". Each note has a predetermined quantified pitch (MIDI key value) of the following:

Do—60;
Re—62;
Mi—64;
Re—62; and
Do—60.

A first order derivative, Δ may be obtained using the equation:

Δ=Pitch(current)−Pitch(previous)

The result of the first order derivative, Δ is shown in the third row of the table of FIG. 3. Subsequently, the first order melody contour (UDR) is derived depending on a value of the first order derivative, Δ, where:

Δ>0:U;

Δ=0:R; and

Δ<0:D.

The result of the first order melody contour (UDR) is shown in the fourth row of the table of FIG. 3. Next, a second order derivative, ΔΔ may be obtained using the equation:

ΔΔ=|Δ(current)|−|Δ(previous)|

The result of the second order derivative, ΔΔ is shown in the fifth row of the table of FIG. 3. Subsequently, the second order melody contour (udr) is derived depending on a value of the second order derivative, ΔΔ, where:

ΔΔ>0:u;

ΔΔ=0:r; and

ΔΔ<0:d.

The result of the second order melody contour (udr) is shown in the sixth row of the table of FIG. 3.

Figure 5:
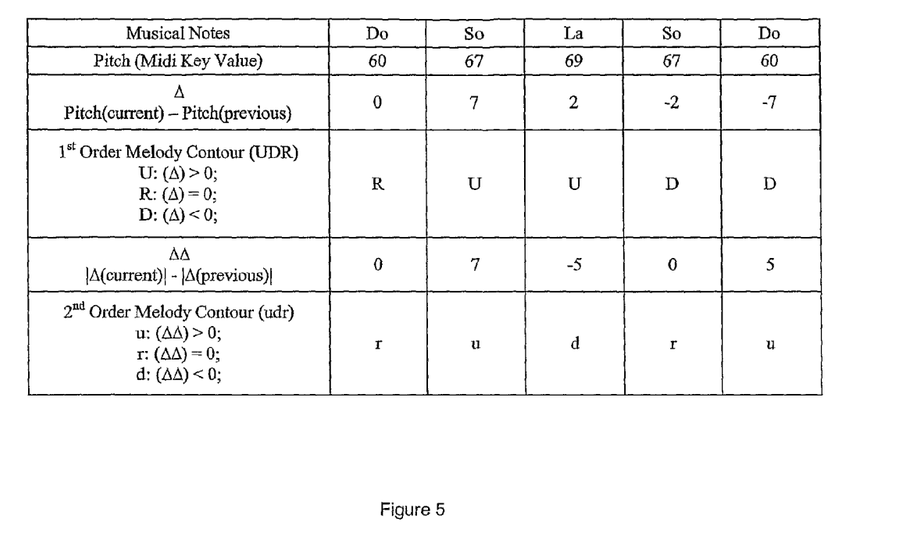
FIG. 5 shows an example to illustrate how the first order melody contour (UDR), and the second order melody contour (udr) for another melody is derived.

Referring to FIG. 5, there is shown the first (UDR) and second (udr) order contours of a second tune is "Do So La So Do". It can be seen that the first order (UDR) contours of the first tune "Do Re Mi Re Do" is the same as that of the second tune "Do So La So Do". However, the second order (udr) contours of the first and second tunes differ. This clearly demonstrates how the use of the second order (udr) contours aids in the accuracy of distinguishing different tunes.

The duration contour (LSK) is also a derivable parameter and may be classified in the following three groups:

DD=Duration(current note)−Duration(previous note)

L is for DD>0;
K is for DID=0; and
S is for DD<0.

Thus, L is an instance when a current note is of a longer duration than that of a previous note. K is an instance when both the current and previous notes are of the same duration and S is an instance when a current note is of a shorter duration than that of a previous note.

It should be noted that even though scales of pitch transition are ignored when using melody contour analysis, the use of the second order melody contour overcomes this shortcoming of overlooking the scales of pitch transition as pitch contour "acceleration" is analysed in this instance.

Comparisons between the input and the stored audio files may be based on melody contour analysis based on the first order melody contour (UDR), the second order melody contour (udr) and the duration contour (LSK) for an audio output for each stored audio file. The comparison may be based on the application of the following equations:

D(i,j) represents a distance between notes of an input and the audio output of the stored audio file.

$$D(i, j) = \min \begin{cases} D(i-1, j-1) + SubCost@(i, j) \\ D(i-1, j) + DelCost@(i, j) \\ D(i, j-1) + InsCost@(i, j) \end{cases} \quad (1)$$

Cost@(i,j) represents the total cost caused by a combination of UDR, udr and LSK errors.

$$Cost@(i,j)=UDRCost@(i,j)+udrCost@(i,j)+LSKCost@(i,j) \quad (2)$$

UDRCost@(i,j) represents the cost of error from UDR.

$$UDRCost@(i, j) = \begin{cases} 0, & \text{no } UDR \text{ error at } (i, j) \\ 2.0, & (i, j) \text{ is an } UDR \text{ insertion error } (InsCost) \\ 2.0, & (i, j) \text{ is an } UDR \text{ deletion error } (DelCost) \\ 2.0, & (i, j) \text{ is an } UDR \text{ substitute error } (SubCost) \end{cases} \quad (3)$$

It should be noted that the value of '2.0' for the error above is merely representative and it may take the value of any number greater than zero.

udrCost@(i,j) represents the cost of error from udr.

$$udrCost@(i, j) = \begin{cases} 0, & \text{no } udr \text{ error at } (i, j) \\ 1.0, & (i, j) \text{ is an } udr \text{ insertion error } (InsCost) \\ 1.0, & (i, j) \text{ is an } udr \text{ deletion error } (DelCost) \\ 1.0, & (i, j) \text{ is an } udr \text{ substitute error } (SubCost) \end{cases} \quad (4)$$

It should be noted that the value of '1.0' for the error above is merely representative and it may take the value of any number greater than zero.

LSKCost@(i,j) represents the cost of error from LSK.

$$LSKCost@(i, j) = \begin{cases} 0, & \text{no } LSK \text{ error at } (i, j) \\ 2.0, & (i, j) \text{ is a } LSK \text{ insertion error } (InsCost) \\ 2.0, & (i, j) \text{ is a } LSK \text{ deletion error } (DelCost) \\ 2.0, & (i, j) \text{ is a } LSK \text{ substitute error } (SubCost) \end{cases} \quad (5)$$

It should be noted that the value of '2.0' for the error above is merely representative and it may take the value of any number greater than zero.

Figure 4:
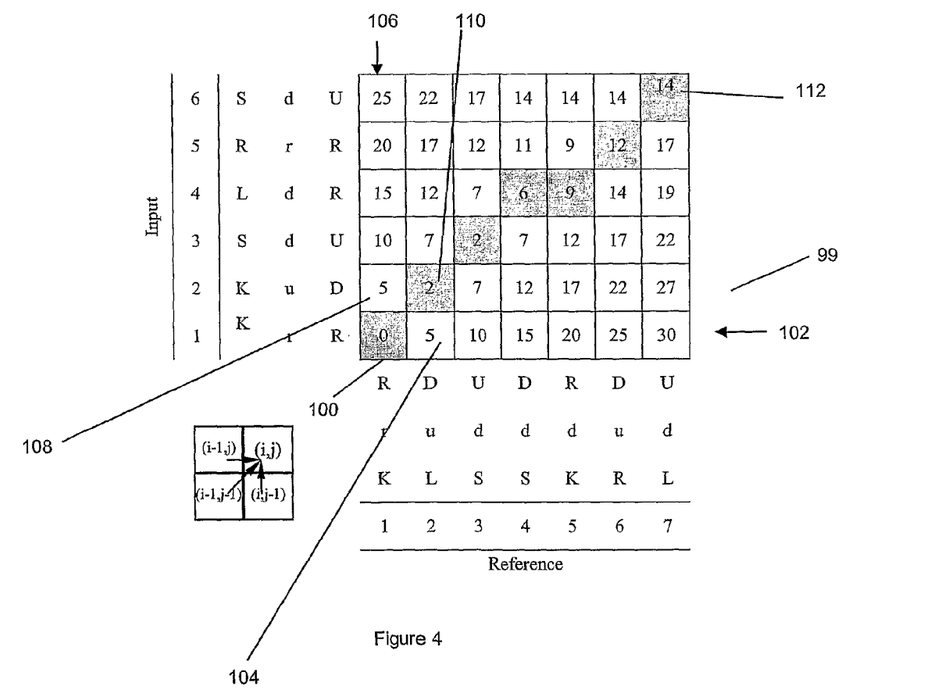
FIG. 4 shows a sequence denoting how an audio file is matched with an audio input using a preferred embodiment of the present invention.

Referring to FIG. 4, there is shown an example in relation to how the above equations (1)-(5) are utilized in the comparison process (40). A portion of one of the stored audio files is expressed in terms of the first order melody contour (UDR), the second order melody contour (udr) and the duration contour (LSK). The portion of one of the stored audio files is expressed in the form of the following matrix:

$$\text{Reference melody:} \begin{bmatrix} R & D & U & D & R & D & U \\ r & u & d & d & d & u & d \\ K & L & S & S & K & R & L \end{bmatrix}$$

An input is also expressed in terms of the first order melody contour (UDR), the second order melody contour (udr) and the duration contour (LSK). The illustrative input is expressed in the form of the following matrix:

$$\text{Input melody:} \begin{bmatrix} R & D & U & R & R & U \\ r & u & d & d & r & d \\ K & K & S & L & R & S \end{bmatrix}$$

It should be noted that the reference melody has seven notes while the input melody has six notes. It is not necessary for both the input and reference melodies to have an identical number of notes. This instance may be borne out in the situation where, for example, a user hums a portion of a song that is in a stored audio file, a user hums a variation of a song (off-key), or errors may be introduced when the input melody is converted by the analog-digital converter amongst other possibilities.

Referring to FIG. 4, it can be seen that the reference melody matrix is presented along the horizontal axis and the input melody matrix is presented along the vertical axis of a table of distances 99. The size of the table of distances 99 depends on the number of notes of both the reference melody and the input melody. It should be noted that the darkened squares of the table of distances should be ignored at this initial juncture. Further explanation of the darkened squares will be provided at a subsequent section of the description. It should also be noted that the comparison process (40) may be assisted by a set of processes which does an alignment for the input and reference melodies such that the input melody is correctly compared with a related portion of the reference melody. The alignment between the input and reference melodies may be performed by a processor/controller. The alignment process is done using any known comparison methods such as, for example, enumerated comparison of distance and the like.

Referring to a starter box 100, the value is "0" because a first note of the reference melody and a first note of the input melody matches in terms of the melody contours, "RrK". This means that the Cost@(i,j)=0 (as per equation (2)) as each of UDRCost@(i,j), udrCost@(i,j), and LSKCost@(i,j) is equal to "0" as there is no UDR (as per equation (3)), udr (as per equation (4)), and LSK (as per equation (5)) error respectively. As such, the value D for the starter box 100 is "0" as per equation (1) as there are no earlier reference notes for comparison.

A first row 102 of the table of distances is subsequently filled in. A second box 104 in row 102 of the table has a value of "5" because the Cost@(i,j)=5 as each of UDRCost@(i,j), udrCost@(i,j), and LSKCost@(i,j) is equal to "2", "1" and "2" respectively as there is UDR, udr, and LSK error respectively since the first note of the input melody differs significantly from the second note of the reference melody. As such, D=5 for box 104. Subsequent boxes along the row 102 would have values of 5 more than a previous box along the first row 102 as per the application of equations (1)-(5).

Next, a first column 106 of the table of distances is filled in. A second box 108 in column 106 of the table has a value of "5" because the Cost@(i,j)=5 as each of UDRCost@(i,j), udrCost@(i,j), and LSKCost@(i,j) is equal to "2", "1" and "2" respectively as there is UDR, udr, and LSK error respectively since the second note of the input melody differs significantly from the first note of the reference melody. As such, D=5 for box 106. Subsequent boxes along the column 106 would have values of 5 more than a previous box along the first column 106 as per the application of equations (1)-(5).

A box 110 diagonal to the starter box 100 is subsequently filled. In this instance, the input melody is "DuK" while the reference melody is "DuL". Thus, it can be seen that there is an LSK error. Thus, LSKCost@(i,j) is equal to "2". Correspondingly, Cost@(i,j)=2 and D=0+2=2.

All other entries in the table of distances are computed sequentially as per the manner described above. The values in each box of the table of distances 99 are not randomly generated figures. The values in each box of the table of distances are actually cumulative scores.

After the values in the table of distances 99 are computed, the values in the table 99 aid in determining how "close" an input melody matches the reference melody with the use of a scoring system. A "closeness" score is obtained by a continuous path with a lowest summation of values from the starter box 100 to an ending box 112. The darkened squares denote the continuous path with the lowest summation of values from the starter box 100 to the ending box 112. The "closeness" score in this instance is 14. Another reference melody with a lower "closeness" score than 14 would mean that it is a closer match with the input melody, while yet another reference melody with a higher score than 14 would mean that it is a worse match with the input melody.

Figure 2:
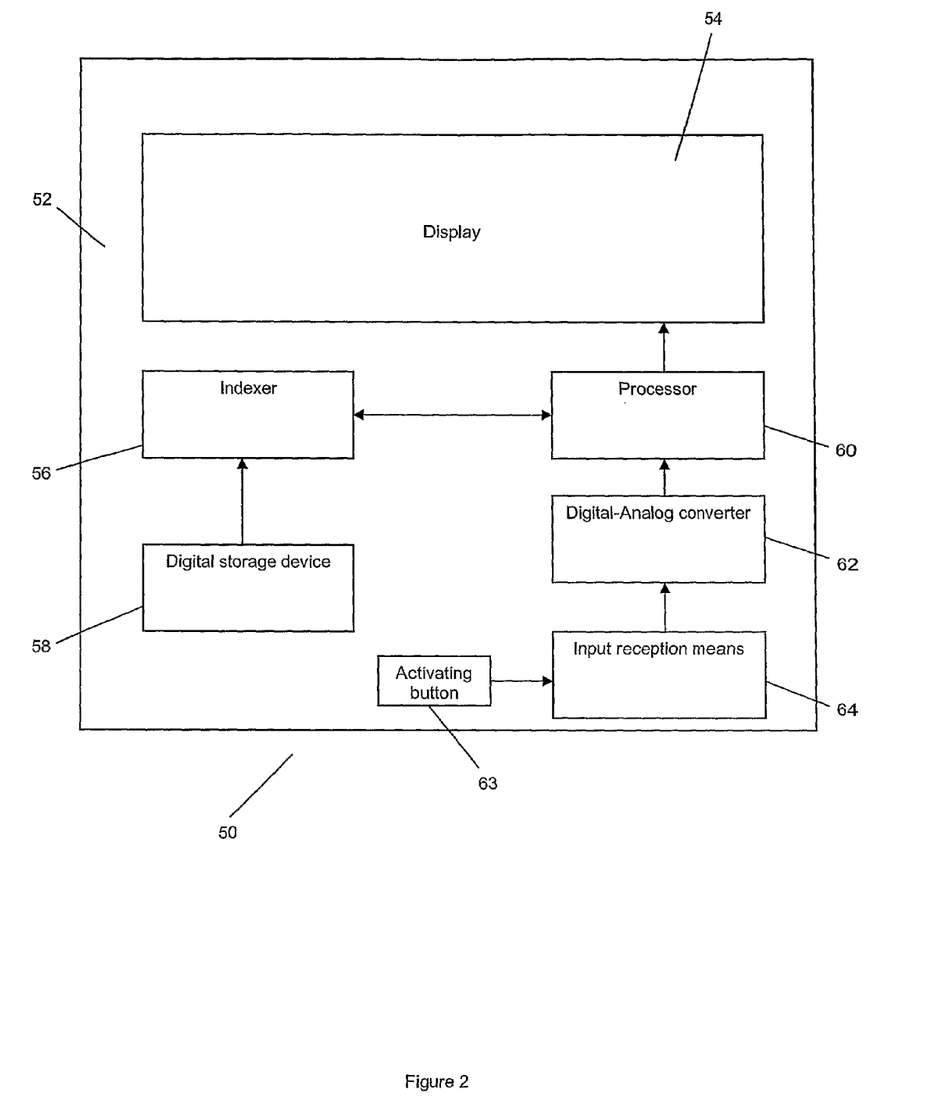
FIG. 2 shows a schematic diagram of an apparatus of a preferred embodiment of the present invention.

Referring to FIG. 2, there is provided an apparatus 50 for accessing at least one audio file from a collection comprising more than one audio file stored within or accessible with the apparatus 50. The apparatus 50 may be for example, a vehicle audio system, desktop computer, notebook computer, PDA, portable media player or mobile phone. The components described in the following sections may be incorporated in the aforementioned different forms of the apparatus 50 in addition to components used for their primary functionalities.

The apparatus 50 may include a digital storage device 58 for the storage of the audio files that make up the collection of files. The digital storage device 58 may be non-volatile memory in the form of a hard disk drive or flash memory. The digital storage device 58 may have capacities of at least a few megabytes.

In addition, the apparatus 50 may also include an indexer 56 for generating an index comprising of information entries obtained from each of the more than one audio files in the collection. The index may comprise information entries obtained from each of the more than one audio file in a collection of audio files stored in the digital storage device 58 of the apparatus 50, any device functionally connected to the apparatus 50 or a connected computer network. Each audio file in the collection may be linked to at least one information entry in the index. The at least one information entry may be musical notes or waveforms determined using semantic segmentation corresponding to a portion or the whole content stored in the audio files. The information entry may also be a MIDI component that is linked/attached to an audio file like file metadata. The information entry may also be obtainable from a pre-recorded vocal entry linked/attached to the audio file, or a connected computer network. There may be an online database on the connected computer network where information entries of musical notes or waveforms are downloadable for each audio file. The information entry may include a first order melody contour (UDR), a second order melody contour (udr) and a duration contour (LSK) for an audio output for each audio file.

An input reception means 64 for receiving an input during a reception mode may also be included in the apparatus 50. The input reception means 64 may be a microphone. The input may be singing, humming, whistling, MIDI signals or musical notes. In a particular instance, the input need not be a song in its entirety. A portion of a song may be sufficient as a viable form of the input. The input may also be filtered. There may be a selector to choose the type of input, or detection of input may be automatic. The input reception mode may be activated by pressing an activating button 63 incorporated with the apparatus 50 at least once. Vocal input into the input reception means 64 may be speaker independent. The input reception mode may have automatic volume correction for the vocal input if the vocal input is either too loud (such that distortion of input occurs) or too soft (such that input is inaudible). The electronic device may also be able to overcome the problem of an off tune vocal input during the input mode by providing a selection of audio files that most closely approximates to the off tune vocal input based on the entries of the audio files in the index. The user may set the device to show the closest approximations up to a pre-determined number, such as, for example, the ten closest approximations. The index may comprise the melody contour information for each audio file.

The input reception means 64 may be coupled to an analog-digital converter 62 which converts all input through the input reception means 64 into digital signals. The converter 62 may be an analog-MIDI converter. The converted digital signals are then passed into a processor 60 for analysis of the digital signals into discrete portions, where the discrete portions may be either musical notes or waveforms. Processing of the digital signals by the processor 60 may be done using frequency spectrum analysis or melody contour analysis. The processor 60 may then be able to compare the discrete portions of the signals with the entries in the index generated by the indexer 56. Audio files may thereby be accessible when the discrete portions match at least one of the information entries in the index. Exact or substantial similarity between the discrete portions and entries in the index enable the generation of a listing of audio files in order of extent of similarity. The listing may show a number of audio files, a number that may be pre-determined by the user. A display 54 in the apparatus 50 allows for the listing of files to be shown clearly for selection by the user. The extent of similarity may be based on relative closeness in terms of either musical notes or waveforms.

The visually impaired may be able to use apparatus 50 to access files stored within or accessible with the apparatus 50 using tonal matching. While they are unable to select the files shown on the display 54, they may access the audio file which has been extracted from the collection at their convenience just from using vocal input.

An alternative application of the present invention makes use of the vocal reception mode of the electronic device to ascertain and improve vocal abilities of users. For example, if a user repeatedly fails to find a desired audio file through the use of vocal input into the electronic device, it is highly probable that the user's vocal input (prowess) is flawed. Thus the user is then inclined to continually practice vocal input into the electronic device until improvement is attained in terms of a higher incidence of finding a desired audio file. Thus, a device to conveniently ascertain a level of quality for vocal input is also disclosed.

Whilst there has been described in the foregoing description preferred embodiments of the present invention, it will be understood by those skilled in the technology concerned that many variations or modifications in details of design or construction may be made without departing from the present invention.

The invention claimed is:

1. A non-transitory computer readable medium containing a set of computer executable instructions to perform the steps of:
generating one index comprising of information entries obtained from each audio file in a collection comprising a plurality of audio files, with each audio file in the collection being linked to at least one information entry where the at least one information entry includes, for an audio output for each audio file,
  (a) a first order melody contour (UDR) representing difference in pitch between a current note and a previous note,
  (b) a second order melody contour (udr) representing difference between the first order melody contour of the current note and the previous note, and
  (c) a duration contour (LSK) for the audio output;
receiving an input during an input reception mode;
converting the input into a digital signal using an analog-digital converter, the input includes,
  (a) a first order melody contour (UDR) representing difference in pitch between a current note and a previous note,
  (b) a second order melody contour (udr) representing difference between the first order melody contour of the current note and the previous note, and
  (c) a duration contour (LSK) for the input;
analysing the digital signal of the input into discrete portions using melody contour analysis, where the melody contour analysis is based on:
  comparing the discrete portions of both the audio output for each audio file with the information entries in the index and the input in order to generate a series of values based on errors between:
    the UDR associated with the audio output and the UDR associated with the input;
    the udr associated with the audio output and the udr associated with the input; and
    the LSK associated with the audio output and the LSK associated with the input,
generating a "closeness" score for audio file matching,
wherein the "closeness" score is obtained by a continuous path with a lowest summation of the values; and
wherein the at least one audio file is accessed using the "closeness" score.

2. An apparatus for accessing at least one audio file from a collection comprising more than one audio file stored within or accessible with the apparatus, including:
an indexer configured to generate an index comprising information entries obtained from each of the more than one audio files in the collection, with each audio file in the collection being linked to at least one information entry where the at least one information entry includes, for an audio output for each audio file,
  (a) a first order melody contour (UDR) representing difference in pitch between a current note and a previous note,
  (b) a second order melody contour (udr) representing the difference between the first order melody contour of the current note and the previous note, and
  (c) a duration contour (LSK) for the audio output;
a receiver configured to receive an input during an input reception mode;

an analog-digital converter configured to convert the input into a digital signal, the input includes,
(a) a first order melody contour (UDR) representing difference in pitch between a current note and a previous note,
(b) a second order melody contour (udr) representing difference between the first order melody contour of the current note and the previous note, and
(c) a duration contour (LSK) for the input; and a processor configured to analyse the digital signal into discrete portions of both the audio output for each audio file with the information entries in the index and the input in order to generate a series of values based on errors between:
the UDR associated with the audio output and the UDR associated with the input,
the udr associated with the audio output and the udr associated with the input; and
the LSK associated with the audio output and the LSK associated with the input,
wherein the processor also generates a "closeness" score for audio file matching, the "closeness" score is obtained by a continuous path with a lowest summation of the values.

3. The apparatus of claim 2, wherein the apparatus is selected from a group consisting of: vehicle audio system, desktop computer, notebook computer, personal digital assistant (PDA), portable media player and mobile phone.

4. The apparatus of claim 2, wherein the input is selected from a group consisting of: singing, humming, whistling, musical instrument digital interface (MIDI) signals and musical notes.

5. The apparatus of claim 4, wherein the input is set by means selected from a group consisting of: manual selection and automatic selection.

6. The apparatus of claim 2, wherein the input is speaker independent.

7. The apparatus of claim 2, wherein the at least one information entry is received from a source selected from a group consisting of: the audio file, a pre-recorded vocal entry linked to the audio file, and a connected computer network.

8. The apparatus of claim 2, wherein the input reception mode is activated by depressing at least one button at least once.

9. The apparatus of claim 2, further including a display.

10. The apparatus of claim 2, wherein the input is filtered.

11. The apparatus of claim 2, wherein the audio file is accessible from a source selected from a group consisting of: the electronic device, any device functionally connected to the electronic device and a connected computer network.

12. A method of determining a level of quality for vocal input, comprising:
using an apparatus for accessing at least one audio file from a collection comprising more than one audio file stored within or accessible with the apparatus, including:
an indexer configured to generate an index comprising information entries obtained from each of the more than one audio files in the collection, with each audio file in the collection being linked to at least one information entry where the at least one information entry includes, for an audio output for each audio file,
(a) a first order melody contour (UDR) representing difference in pitch between a current note and a previous note,
(b) a second order melody contour (udr) representing difference between the first order melody contour of the current note and the previous note, and
(c) a duration contour (LSK) for the audio output;
a receiver configured to receive an input during an input reception mode;
an analog-digital converter configured to convert the input into a digital signal, the input includes,
(a) a first order melody contour (UDR) representing difference in pitch between a current note and a previous note,
(b) a second order melody contour (udr) representing difference between the first order melody contour of the current note and the previous note, and
(c) a duration contour (LSK) for the input; and
a processor configured to analyse the digital signal into discrete portions of both the audio output for each audio file with the information entries in the index and the input in order to generate a series of values based on errors between:
the UDR associated with the audio output and the UDR associated with the input,
the udr associated with the audio output and the udr associated with the input, and
the LSK associated with the audio output and the LSK associated with the input,
wherein the processor also generates a "closeness" score for audio file matching, the "closeness" score is obtained by a continuous path with a lowest summation of the values.

* * * * *